(12) United States Patent
Kim

(10) Patent No.: US 7,800,022 B2
(45) Date of Patent: Sep. 21, 2010

(54) DEVICE FOR COOKING IN INDIRECT HEATING

(76) Inventor: Hong-Bae Kim, 349-1, Maekgeum-dong, Paju-si, Kyonggi-do (KR)

( * ) Notice: Subject to any disclaimer, the term of this patent is extended or adjusted under 35 U.S.C. 154(b) by 680 days.

(21) Appl. No.: 11/790,570

(22) Filed: Apr. 26, 2007

(65) Prior Publication Data

US 2008/0035630 A1 Feb. 14, 2008

(30) Foreign Application Priority Data

May 26, 2006 (KR) ...................... 10-2006-0047398

(51) Int. Cl.
*F24C 7/10* (2006.01)
*A47J 43/14* (2006.01)

(52) U.S. Cl. ............................ 219/386; 99/281; 99/285; 99/337; 99/453; 99/456; 99/348; 99/483; 99/509; 99/512; 99/564

(58) Field of Classification Search ................ 219/386; 99/348, 281, 285, 337, 53, 456, 483, 509, 99/512, 564
See application file for complete search history.

(56) References Cited

U.S. PATENT DOCUMENTS 6,792,849 B1  9/2004  Kim

2001/0002891 A1  6/2001  Frankel et al.
2005/0051032 A1  3/2005  Kim

FOREIGN PATENT DOCUMENTS

| EP | 1 483 989 A1 | 12/2004 |
|---|---|---|
| KR | 10-2005-0032272 | 4/2005 |
| KR | 10-0495838 | 6/2005 |
| WO | WO 01/03559 A | 1/2001 |
| WO | WO 2005/037036 A | 4/2005 |
| WO | 2006/017967 | * 2/2006 |
| WO | WO 2006/017967 A | 2/2006 |

* cited by examiner

*Primary Examiner*—Shawntina Fuqua
(74) *Attorney, Agent, or Firm*—Nixon & Vanderhye P.C.

(57) ABSTRACT

The present invention relates to a cooking device comprising a coupling housing having a detachable vessel with a detachable pulverizing blade, a screen formed on its lateral surface, a handle grip with a coupling point of contact, a sensor and a plate type of a heater on which a plurality of heat bands are installed to adjust the caloric value; a base coupled to the lower part of the coupling housing with a motor and a controller; a coupling part coupled to the handle grip with the coupling groove which has an electric point of contact to be connected the coupling point of contact; and a sensor control circuit having an input circuit to receive electric signals generated from two electrodes, a control circuit to control the operation of electric devices connected to an output circuit with the electric signals from the input circuit, and a safety circuit to check the operation of the control circuit.

24 Claims, 4 Drawing Sheets

DEVICE FOR COOKING IN INDIRECT HEATING

TECHNICAL FIELD

The present invention relates to a device for cooking in indirect heating. Specifically, the present invention relates to a device for cooking with a plate heater mounted outside of the bottom of a receiving side, a motor mounted under the heater, and a sensor control circuit.

BACKGROUND ART

Various kinds of automatic cooking food devices have been developed. They are manufactured smaller in size and automatically operated to be used for household cooking, for example, coffee machines, blenders for fruits or vegetables, appliances for making soybean curd or soybean milk, or appliances for making porridges. In particular, an appliance for making soybean curd or soybean milk should be equipped with various components for pulverizing and heating processes, which are simultaneously required in the process of cooking. And such components should be properly arranged for the convenient and safe usage of the cooking device.

Many types of devices for making soybean curd or soybean milk are disclosed in known arts. Korean patent application No. 10-2003-0068301 discloses an appliance for preparing porridges, wherein a driving part with motor and controller is positioned at the upper side and a cooking vessel is positioned at the lower side detachably coupled the driving part.

An appliance for making soybean curd or soybean milk comprises the motor positioned at the upper or lower side of the appliance. If the driving part is installed at the upper side, the appliance becomes less stable and it is inconvenient to use the appliance, but it can solve a water leakage problem. On the contrary, if the driving part is installed at the lower side, such problems are solved, but the cost of preventing the water leakage problem can be increased.

Korean patent application No. 10-2004-0115661 discloses an appliance for making soybean curd or soybean milk wherein a motor is installed at the lower side. The above-mentioned invention improves the stability of the appliance, but it may lower the efficiency of heating and controlling and it is inconvenient to use.

The water leakages problem due to the lower positioning of the driving part may be solved with the technical development of sealing.

The device for cooking in indirect heating has an advantage of heating the food regularly food compared with a direct heating system. However, it has a disadvantage of lowering the thermal efficiency since heat is unnecessarily delivered to peripheral devices. Thus, these problems should be solved by the device for cooking in indirect heating.

Another disadvantage of existing cooking devices is that they should use each different device for making fruit juices, soybean curt, soybean milk, coffee, or for boiling down medical herb. The entire cooking process should be automatically made in the series of successive operation stages, and at the same time, if a cooking device is manufactured to prepare various kinds of food, it may produce several advantages. Therefore, it is necessary to make combined cooking devices for preparing various kinds of foods. Such devices should have a stability to be used for household cooking. Especially an electrical stability is an important factor in manufacturing such devices since they are operated by electric apparatus.

Accordingly, in order to solve above mentioned problems, the present invention suggest a device for cooking in indirect heating that has a higher efficiency of transferring heat and prepares various foods with the means of ensuring electric safety.

The object of the present is to provide a combined device for cooking in indirect heating with a plate heater and a sensor circuit.

BRIEF DESCRIPTION OF THE DRAWINGS

The above and other objects, features and advantages of the present invention will be apparent from the following detailed description of the preferred embodiments of the invention in conjunction with the accompanying drawings, wherein.

DISCLOSURE OF THE INVENTION

According to the preferred embodiments of the present invention, examples are illustrated in the accompanying drawings.

The terms used in the present invention are defined in accordance with the functions made in the present invention, which may be varied according to the intention or practices of those people who work in the arts, and therefore, it should be understood that they do not limit the technical components of the present invention.

Figure 1:
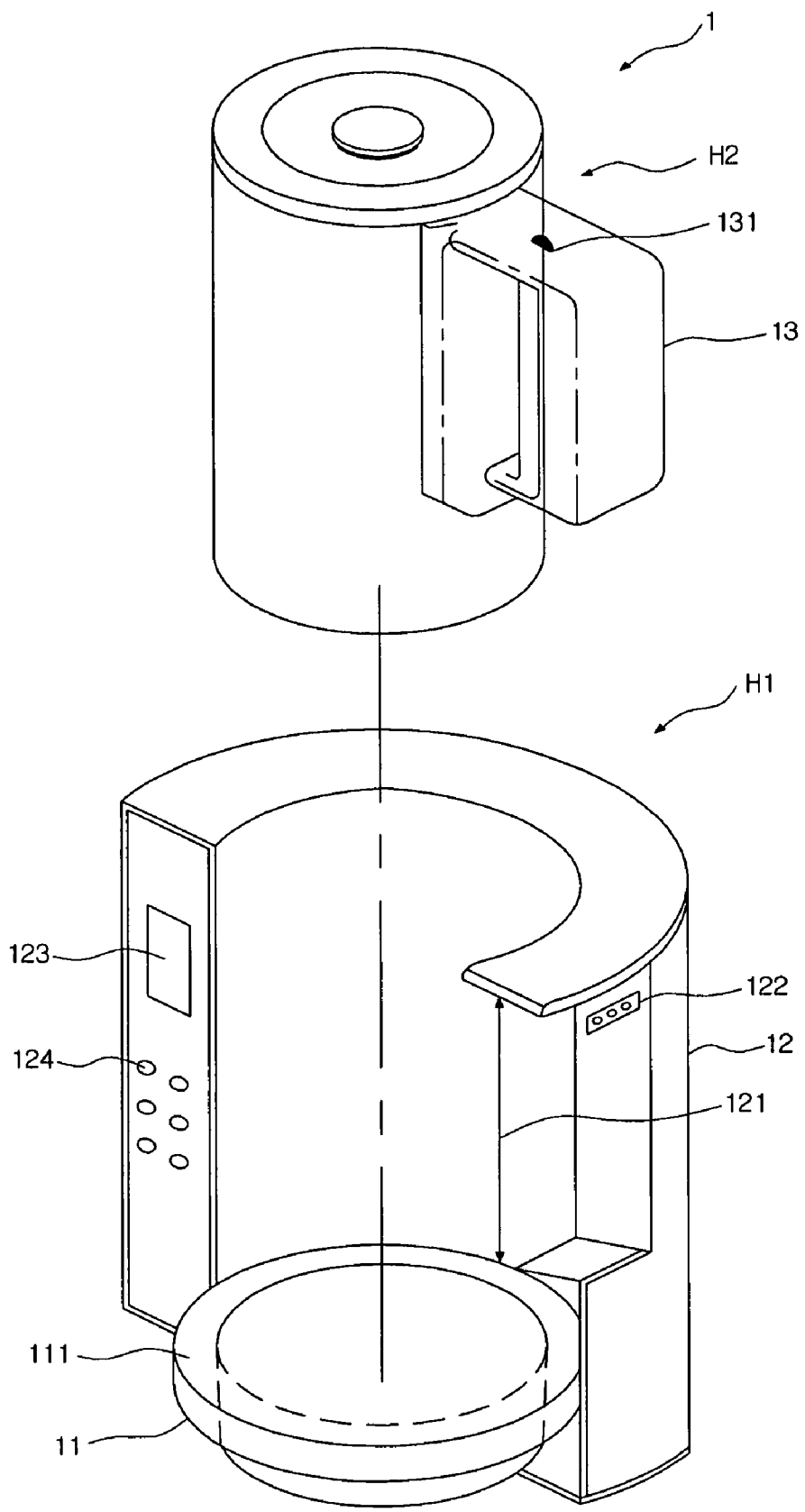
FIG. 1 is an exploded perspective view of the device according to the present invention.

Referring to FIG. 1, the cooking device according to the present invention comprises a fixed housing H1 and a coupling housing H2 coupled to the fixed housing H1. The fixed housing H1 may be a cylindrical shape and has a base 11 to support the fixed housing H1, and a coupled part 12 to separate or couple the fixed housing H1. The fixed housing H1 may have a cylindrical shape of appearance which is opened on a side thereof, and the coupling housing H2 may take a cylindrical shape to be coupled to the fixed housing H1. A coupling band 111 is mounted on the base 11, and a coupling groove 121 is mounted on the opened lateral side of the coupling part 12 in order to couple the fixed housing H1 and the coupling housing H2. The coupling band 111 is installed around the upper edge to receive the lower part of coupling housing H2. The coupling housing H2 is coupled to be rotated inside the coupling band 111, and a handle grip 13 mounted on the lateral side of the coupling housing H2 is coupled to the coupling groove 121 of the coupled part 12. If the inner surface of the coupling groove 121 is closely attached to the lateral face of the handle grip 13, the coupling housing H2 is fixed to the fixed housing H1. If the handle grip 13 is stably coupled and fixed on the coupled groove 121, a contact point (not shown in FIG. 1) formed on the lateral face of the handle grip 13 is brought into contact with an electric contact point 122 formed inside of the coupling groove 121 in order to supply power. A coupling protrusion 131 made of an elastic material may be provided, if necessary, at the top surface of the handle grip 13, and a corresponding groove (not shown in FIG. 1) may be provided at the top surface of the coupling groove 121. The coupling protrusion 131 and the coupling groove 121 determine where to position the fixed housing H1 and the coupling housing H2, and ensure their stably coupling. An LCD monitoring display 123 and a selection button 124 may be provided on the opposite surface of the fixed housing H1 and the coupling part 12 in order to display the kind of food prepared by the cooking device and its cooking process. The LCD display 123 and the selection button 124 may be installed at an appropriate position.

The fixed housing Hi and the coupling housing H2 may be made of insulating materials and manufactured double-layered to prevent heat from passing through the wall.

Figure 2:
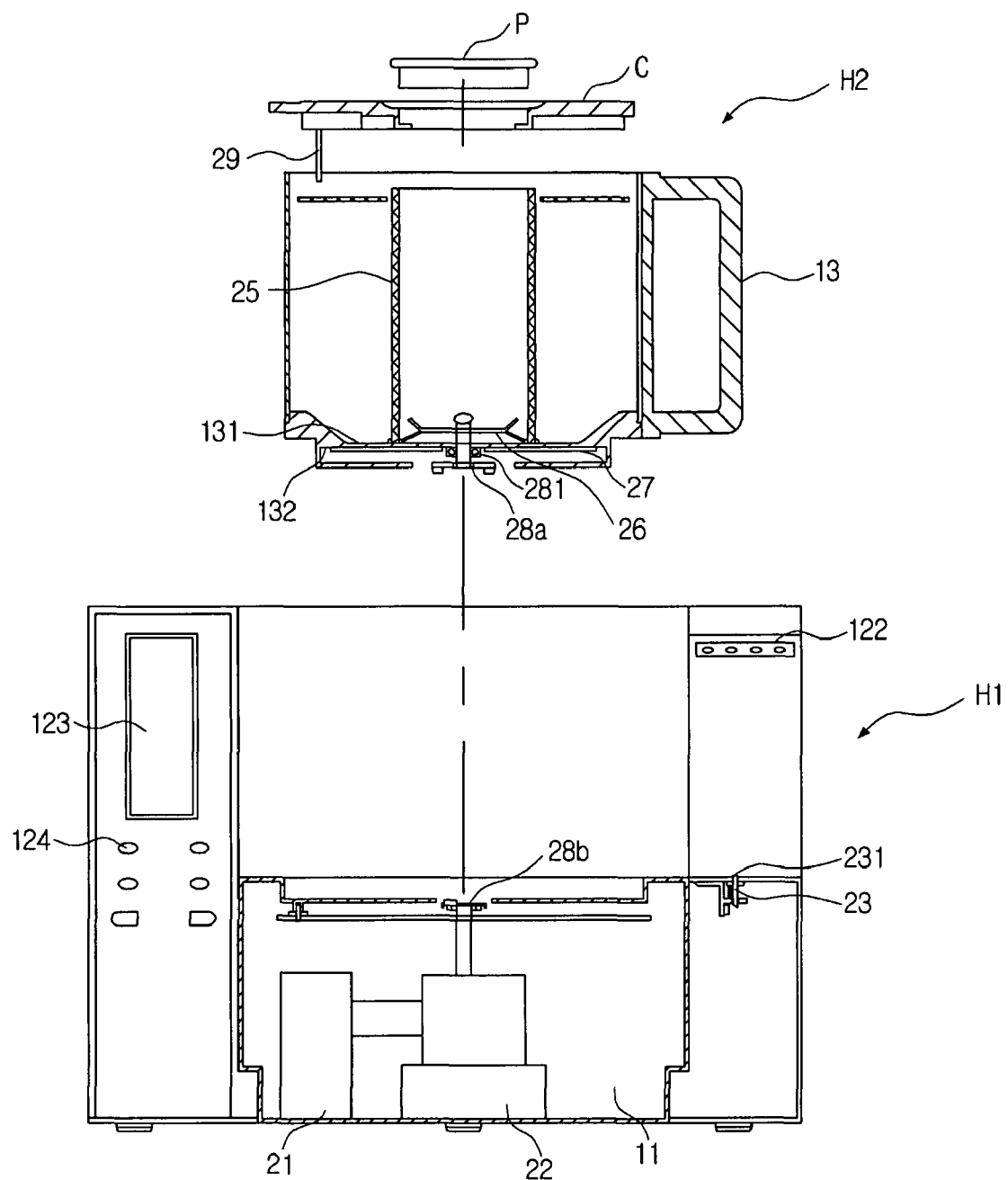
FIG. 2 is a sectional view of the internal structure of the device according to the present invention.

Referring to FIG. 2, the fixed housing H1 comprises a controller 21 and a motor 22 installed inside the base 11. The controller 21 controls the operation of each part to prepare a food selected by users with the selection button 124. The motor 22 provides rotary power for pulverizing ingredients according to directions from the controller 21. The fixed housing H1 also comprise a safety device 23. The safety device 23 is installed beneath the base 11 which contacts with the bottom of the handle grip 13 of the coupling housing H2. As shown in FIG. 2, the safety device 23 comprises a protrusion 231 above the base 11. The protrusion 231 moves up and down and is operated by an elastic body such as a spring. The handle grip 13 comprises a corresponding groove (not shown) to the protrusion 231. If the handle grip 13 is not perfectly coupled to the coupled part 12, the protrusion 231 protrudes from the base 11, cutting the power supply for operating each device of the cooking device. Users may optionally stop the power supply for boiling the water. When the handle grip 13 is perfectly coupled to the coupling part, the protrusion 231 is pressed downwardly by the bottom surface of the handle grip 13, and in turn connects the electricity for supplying power. The safety device 231 substantially prevents an additional electric incident. As explained above relating to FIG. 1, the functions of the electric contact point 122 and a corresponding contact point are for initially preventing safety concern. However, like the electric contact point 122 is optionally used for supplying power to heat food, and the safety device 23 may cut the power for operating the motor 22, a certain electric device may be used to determine whether to cut another electric device or not. The installation and operating methods of such electric contact point 122 and the safety device 23 are conducted by the methods in known arts.

The coupling housing H2 comprises a separated vessel 25 having a screen on its lateral surface, a pulverizing blade 26 mounted inside the separated vessel 25, a heater 27 mounted at the bottom side of the fixed housing H2 and a coupling shaft 28a and 28b which transmit rotatory power of the motor 22 to the pulverizing blade 26.

The separated vessel 25 is detachably mounted on an inner bottom surface B1 of the coupling housing H2, using several fixed protrusions 251. The fixed protrusions 251, for example, may be placed to make a gap between two elastic protrusions by their elasticity. Several numbers of these fixed protrusions 251 may be mounted on the inner bottom surface B1 and a lower edge of the separated vessel 25 may be insulted to the gap between the fixed protrusions 251. The separated vessel 25 may have a cylindrical shape of appearance with its both upper and bottom sides opened. The screen placed on the lateral surface of the separated vessel 25 separates cooking water produced by the pulverizing blade. The separated vessel 25 may be detachably mounted inside the coupling housing H2 in a various way. The pulverizing blade 26 mounted inside the separated vessel 25 pulverizes cooking ingredients. The pulverizing blade 26 takes various forms according to the methods in known arts, but it is right to comprise a pulverized part and a separated part. As shown in FIG. 2, the pulverized part forms the upper housing with a substantial function of pulverizing cooking ingredients, and the separated part forms the lower housing with a function of maintaining cooking ingredients at the lower part of the housing. Some foods do not require pulverizing. In this case, the pulverizing blade 26 is not a necessary cooking device. Therefore, it is a more efficient way to detachably mount the pulverizing blade 26.

The pulverizing blade 26 operates by rotatory power of the motor transmitted from the coupling shaft 28a and 28b. Among the pair of the coupling shaft 28a and 28b, one 28a is installed under the pulverizing blade 26 and the other is connected to the shaft of the motor 22. A sealing device 281 are installed between the pulverizing blade 26 and the coupling shaft 28a to prevent the water leakage problem. The sealing device 281 may comprise sealing devices according to the methods in known arts, such as rubber rings, and the coupling shaft 28a and 28b also may be chosen by the methods in known arts.

The coupling housing H2 comprises the heater 27 attached to the opposite side B2 of the bottom surface B1 on which fixed protrusions 251 are mounted. The heater 27 may take a thin disk-like shape and be installed to create gaps at regular intervals around the sealing device 281. The gap prevents heat from the heater 27 from being delivered to the shaft connected to the sealing device or the motor 22 and the pulverizing blade 26. Further explanations on the heater 27 will be provided in later sections relating to FIG. 3.

The coupling housing H2 may comprise a cover C, and the cover C may comprise a plug P to add further ingredients in the process of cooking. The plug P may be formed according to the method in known arts. The coupling housing H2 comprises a sensor 29 mounted beneath the cover C. The sensor 29 with a built-in temperature measurement device such as a thermistor measures the inner temperature and, if necessary, detects water levels and whether bubble is excessively generated so that the controller 21 responds to such cases.

Further explanations on the heater 27 and the sensor 29 will be provided in later sections.

Figure 3:
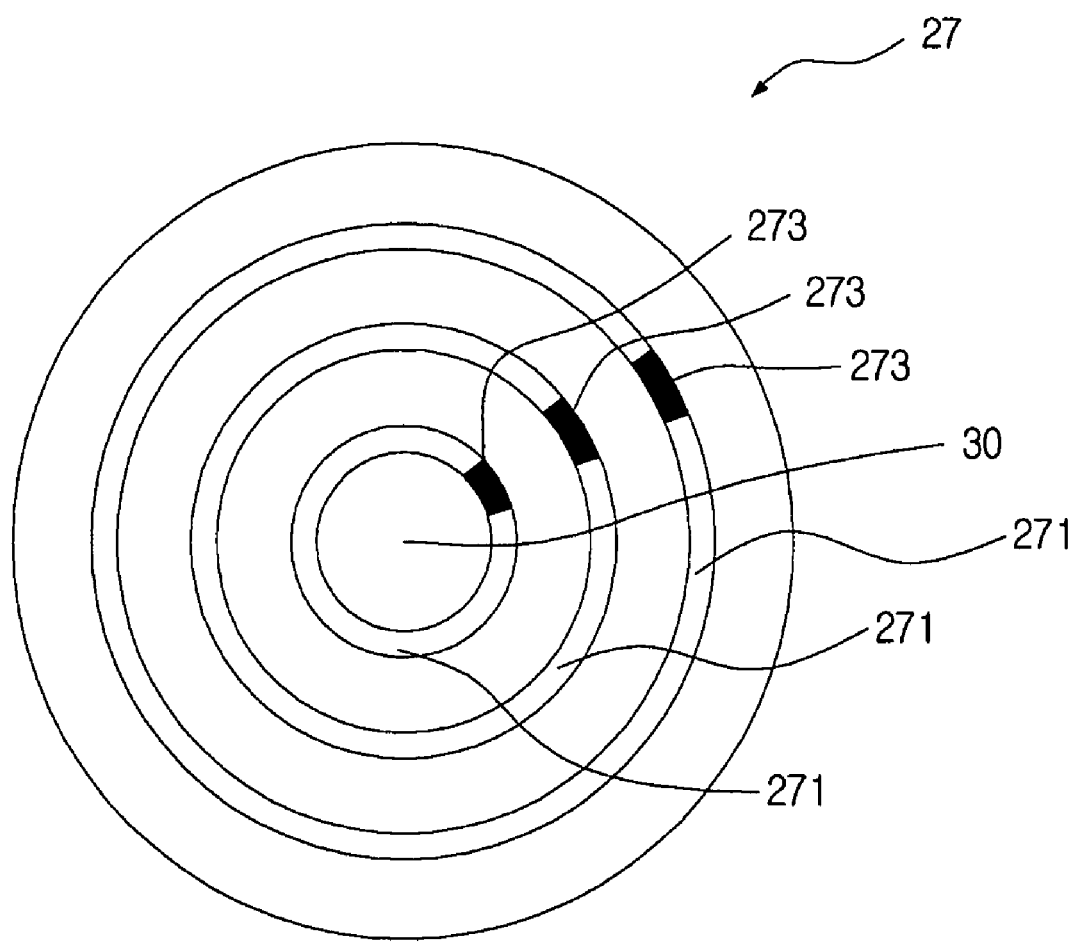
FIG. 3 is a sectional view of the heater in according to the present invention.

Referring to FIG. 3, the heater 27 may comprise several numbers of ring-type heat bands 271 and a through-hole 30 which the coupling shaft passes through. The heater 27 may comprise an insulating board, a band or ring-type of several metallic heating units such as iron, nickel and chrome and nonmetallic heating units such as carbon, zircon and molybdenum. The amount of heating may depend on the kind of ingredients and the cooking process. The controller may adjust the caloric value in a various ways. Among a plurality of heating bands installed within the insulating board, a particular heating band may operate alone, or the entire electric power supplied to the heater 27 may be controlled to adjust the caloric value. The preferred shape of the heater 27 is a thin disk-like with 1~10 mm in thickness. As shown in FIG. 3, the heat band 271 may be installed to have a specific area generating concentrated heat and in turn transmitted to the remaining areas. A heat sensor device 273, if necessary, may be separately installed to detect and adjust heat from the heater 27 or a heat-generating area of the heater 27. The heat sensor device 273 may comprise a PTC (positive thermal coefficient) thermistor which has a different resistant-value according to the temperature, a NTC (negative thermal coefficient) thermistor or a bimetal. Such a heat sensor device 273 is installed in each heat-generating area such as the heat band 271 in order to control caloric value from the heater 27. Controlling temperature and heating time may be included in the method of controlling caloric value.

The outer surface of the heater 27 (not shown in FIG. 3) may be coated by a substance having a high thermal conductivity such as ceramic. As mentioned above relating to the FIG. 2, the coupling shaft which connects the motor and the pulverizing blade passes through the through-hole 30. The shaft operates, maintaining a regular space from the through-hole. As explained above, the space prevents heat generated from the heater 27 from being transmitted to the shaft.

The cooking device in the present invention is an automatically operating device that allows users to simply press selection buttons for their desired food. For example, the controller decides the operation of the motor, or adjusts the caloric value of the heater. The controller may comprise a microprocessor wherein the standard procedures of preparing various kinds of food selected by users are programmed. The controller controls a sensor controller which will be explained in later sections.

Figure 4:
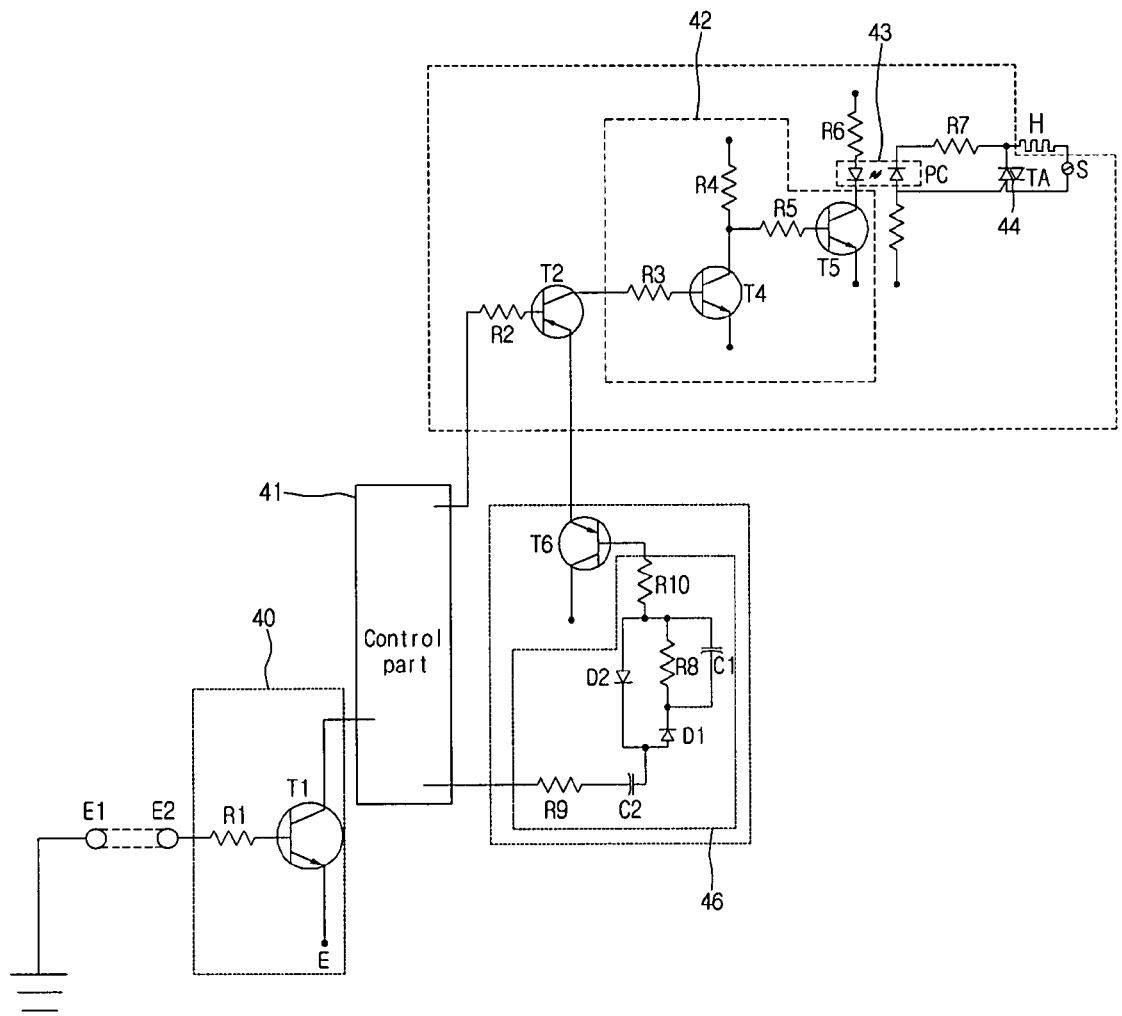
FIG. 4 is a view of sensor control circuit which is installed at the device in according to the present invention.

Referring to FIG. 4, the sensor controller comprise an input circuit 40 which converts an input signal into an electric signal, a control circuit 41 which determines the operation of devices such as the heater according to the received electric signals and a output circuit 42 which starts or stops the operation of the heater. In addition, the sensor controller comprises a safety circuit 46 which stops the operation of the heater in response to an unexpected signal.

The input signal may be sent from a sensor E2. For example, voltage gap between two electrodes E1 and E2 may be an input signal to prevent contents in the cooking vessel from overflowing. Among the two electrodes, one is put to earth and the other is mounted where the water level is marked in the cooking device. If water reaches to the mark in the process of cooking, the voltage gap between the two electrodes is transmitted to the input circuit 40 in the form of input signal. The input signal may also indicate whether the required amount of water is contained in the cooking vessel, or it also indicates an inner temperature of the cooking appliance and excessive bubble generation. When the input signal is converted to temperature, a particular device should be separately installed to convert the input signal to the electric signal. The input circuit 40 may comprise a resistor and a transistor which are necessary for processing electric signals. NPN or PNP types of transistor may be applied, and bias voltage is supplied to one of three terminals. The signal from the input circuit 40 is transmitted to the control circuit 41. The control circuit 41 analyzes the received signals and in turn decides whether to operate a particular device or cut the entire power supply of the cooking appliance. For example, when the water inside the cooking vessel reaches to the marked water level or excessive amount of bubble is generated, the control circuit 41 should stop the operation of the heater and send a signal corresponding to the conditions. The signal from the control circuit 41 is transmitted to the output circuit 42.

The output circuit 42 may comprise a plurality of resistors and transistors to transmit electric signals. The output circuit 42 may use circuitry such as photocoupler 43 or triac 44 in order to control the operation of required devices. For example, when excessive amount of bubble is generated and a regular voltage gap is supplied, the control circuit 41 sends the control signal in order to stop the operation of the heater H. The output circuit 42 transmits the control signal sent from the control circuit 41 to triac 44 through photocoupler 43, so that the electric power S stops to the heater H. In the process, the photocoupler 43 and triac 44 have functions of switching circuit.

The switching circuit may comprise a relay coil or SCR (Silicon Controlled Rectifier).

The safety circuit 46 controls the output circuit 42 according to signals sent from the control circuit 41. If the control circuit 41 receives an alarming signal which indicates excessive amount of water is contained over the marked water level, or excessive amount of bubble is generated, he control circuit 41 may determine whether to send output control signals under each condition. For example, the control circuit 42 may send output signals only when such alarming signals are constantly issued. In the case of excessive bubble generation, the control circuit 42 may not send an alarming signal if it considered the signal as a mere temporary phenomenon. However, when there is a problem in the control circuit 41 itself, some of its functions like generating control signals may not operate properly, which in turn the heater keeps working. The safety circuit 46 detects whether the control circuit 41 operates properly. The safety circuit 46 may comprise a resistor, a capacitor, a diode and a transistor. When there is a problem in the control circuit 41 and a high frequency signal is generated, the safety circuit transmits the signal to output device to stop the operation of the heater. In this case, the capacitor has a function of a low frequency filter. In this way, when the safety circuit 46 receives alarming signals from the control circuit 41, it may control the operation of the heater to ensure the stable operation of the cooking device. As shown in FIG. 4, the signal from the safety circuit 46 is transmitted to the output circuit 42, but, if necessary, the safety circuit 46 may be connected to a device which cut the entire power supply of the cooking device.

The FIG. 4 shows examples of each circuit, and the sensor control circuit of the present invention may be structured in a various ways using various circuit devices. Furthermore, the entire or particular circuit of the sensor control circuit may comprise the control device mentioned above relating to the FIG. 2. When the sensor control circuit is used in the cooking device as explained above relating to the FIG. 2, one of electrode E2 may be connected to the sensor, and the other electrode E1 may be connected to the body of the cooking device or the detachable vessel available to be grounded. In the case of extremely high temperature or excessive bubble generation, the heater may stop its operation. In order to check out the amount of water required for cooking, one of electrode E2 is connected to the pulverizing blade, and the other E1 is connected to the body of the cooking device or another part available to be grounded. When a signal alarms that the two electrodes are detached, the heater or the motor may stop operating. The sensor controller receives a plurality of input signals according to each object to be controlled, so that it may determine the operation of the same or each different electric device.

The cooking device of the present invention comprises an electric wiring according to the method in known arts. The cooking device of the present invention comprises a microprocessor having built-in software which operates the entire cooking process. The controller comprises the microprocessor to control the process of operation of each electric device.

The invention mentioned above is specifically explained providing illustrative embodiments. It is to be appreciated that those skilled in the art can change or modify the embodiments without departing from the scope and sprit of the present invention. While the present invention has been described with reference to the particular illustrative embodiments, it is not to be restricted by the embodiments but only by the appended claims.

According to the present invention, a device for cooking in indirect heating is provided, wherein the driving part comprising a motor and a controller is located at a lower part, enhancing the safety and making easier to use the device. Furthermore, the thin disk-like shaped heater heats the ingredients in indirect heating, keeping clean and increasing efficiency in supplying heat. The device is available in a narrow space, and the safety device installed to the device prevents the potential incidents in using the device.

The invention claimed is:

1. A cooking device with an indirect heating means comprising:

wherein a coupling housing having a detachable vessel with a detachable pulverizing blade and with a screen formed on its lateral surface, a handle grip with a coupling point of contact, a sensor and a plate type of a heater on which a plurality of heat bands are installed to adjust the caloric value;

a base coupled to the lower part of the coupling housing with a built-in motor and a controller;

a coupling groove coupled to the handle grip and in contact with a coupling point, and a coupling part having a safety device;

a sensor control circuit having an input circuit to receive electric signals generated from two electrodes, a control circuit to control the operation of electric devices connected to an output circuit with the electric signals from the input circuit and a safety circuit to check the operation of the control circuit, wherein the surface of the heater is coated with ceramic.

2. A cooking device according to claim 1, wherein one of the two electrodes is grounded, and the other is connected to the sensor or the pulverizing blade.

3. A cooking device with an indirect heating means comprising:

wherein a coupling housing having a detachable vessel with a detachable pulverizing blade and with a screen formed on its lateral surface, a handle grip with a coupling point of contact, a sensor and a plate type of a heater on which a plurality of heat bands are installed to adjust the caloric value;

a base coupled to the lower part of the coupling housing with a built-in motor and a controller, a coupling groove coupled to the handle grip and in contact with a coupling point, and a coupling part having a safety device;

a sensor control circuit having an input circuit to receive electric signals generated from two electrodes, a control circuit to control the operation of electric devices connected to an output circuit with the electric signals from the input circuit and a safety circuit to check the operation of the control circuit, wherein the output circuit comprises a relay coil, SCR or triac.

4. A cooking device with an indirect heating means comprising:

wherein a coupling housing having a detachable vessel with a detachable pulverizing blade and with a screen formed on its lateral surface, a handle grip with a coupling point of contact, a sensor and a plate type of a heater on which a plurality of heat bands are installed to adjust the caloric value;

a base coupled to the lower part of the coupling housing with a built-in motor and a controller;

a coupling groove coupled to the handle grip and in contact with a coupling point, and a coupling part having a safety device;

a sensor control circuit having an input circuit to receive electric signals generated from two electrodes, a control circuit to control the operation of electric devices connected to an output circuit with the electric signals from the input circuit and a safety circuit to check the operation of the control circuit, wherein the output device comprises a photocoupler.

5. A cooking device with an indirect heating means comprising:

wherein a coupling housing having a detachable vessel with a detachable pulverizing blade and with a screen formed on its lateral surface, a handle grip with a coupling point of contact, a sensor and a plate type of a heater on which a plurality of heat bands are installed to adjust the caloric value;

a base coupled to the lower part of the coupling housing with a built-in motor and a controller, a coupling groove coupled to the handle grip and in contact with a coupling point, and a coupling part having a safety device;

a sensor control circuit having an input circuit to receive electric signals generated from two electrodes, a control circuit to control the operation of electric devices connected to an output circuit with the electric signals from the input circuit and a safety circuit to check the operation of the control circuit, wherein the sensor comprises a thermistor.

6. A cooking device according to claim 1, wherein the safety device comprises protrusions mounted above the base.

7. A cooking device according to claim 1, wherein the heater comprises a through-hole and a shaft which passes through the hole maintaining a regular space in between.

8. A cooking device with an indirect heating means comprising:

wherein a coupling housing having a detachable vessel with a detachable pulverizing blade and with a screen formed on its lateral surface, a handle grip with a coupling point of contact, a sensor and a plate type of a heater on which a plurality of heat bands are installed to adjust the caloric value;

a base coupled to the lower part of the coupling housing with a built-in motor and a controller, a coupling groove coupled to the handle grip and in contact with a coupling point, and a coupling part having a safety device;

a sensor control circuit having an input circuit to receive electric signals generated from two electrodes, a control circuit to control the operation of electric devices connected to an output circuit with the electric signals from the input circuit and a safety circuit to check the operation of the control circuit, wherein the pulverizing blade comprises a separated part and a pulverizing part.

9. A cooking device with an indirect heating means comprising:

wherein a coupling housing having a detachable vessel with a detachable pulverizing blade and with a screen formed on its lateral surface, a handle grip with a coupling point of contact, a sensor and a plate type of a heater on which a plurality of heat bands are installed to adjust the caloric value;

a base coupled to the lower part of the coupling housing with a built-in motor and a controller;

a coupling groove coupled to the handle grip and in contact with a coupling point, and a coupling part having a safety device;

a sensor control circuit having an input circuit to receive electric signals generated from two electrodes, a control circuit to control the operation of electric devices connected to an output circuit with the electric signals from the input circuit and a safety circuit to check the operation of the control circuit; and a cover with a stopper.

10. A cooking device according to claim 3, wherein one of the two electrodes is grounded, and the other is connected to the sensor or the pulverizing blade.

11. A cooking device according to claim 4, wherein one of the two electrodes is grounded, and the other is connected to the sensor or the pulverizing blade.

12. A cooking device according to claim 5, wherein one of the two electrodes is grounded, and the other is connected to the sensor or the pulverizing blade.

13. A cooking device according to claim 8, wherein one of the two electrodes is grounded, and the other is connected to the sensor or the pulverizing blade.

14. A cooking device according to claim 9, wherein one of the two electrodes is grounded, and the other is connected to the sensor or the pulverizing blade.

15. A cooking device according to claim 3, wherein the safety device comprises protrusions mounted above the base.

16. A cooking device according to claim 4, wherein the safety device comprises protrusions mounted above the base.

17. A cooking device according to claim 5, wherein the safety device comprises protrusions mounted above the base.

18. A cooking device according to claim 8, wherein the safety device comprises protrusions mounted above the base.

19. A cooking device according to claim 9, wherein the safety device comprises protrusions mounted above the base.

20. A cooking device according to claim 3, wherein the heater comprises a through-hole and a shaft which passes through the hole maintaining a regular space in between.

21. A cooking device according to claim 4, wherein the heater comprises a through-hole and a shaft which passes through the hole maintaining a regular space in between.

22. A cooking device according to claim 5, wherein the heater comprises a through-hole and a shaft which passes through the hole maintaining a regular space in between.

23. A cooking device according to claim 8, wherein the heater comprises a through-hole and a shaft which passes through the hole maintaining a regular space in between.

24. A cooking device according to claim 9, wherein the heater comprises a through-hole and a shaft which passes through the hole maintaining a regular space in between.

* * * * *